Sept. 29, 1942.   G. KEMNA   2,297,222
FILM INSPECTING APPARATUS
Original Filed June 9, 1938   4 Sheets—Sheet 1

Inventor
Gustav Kemna
By Stevens and Davis
Attorneys

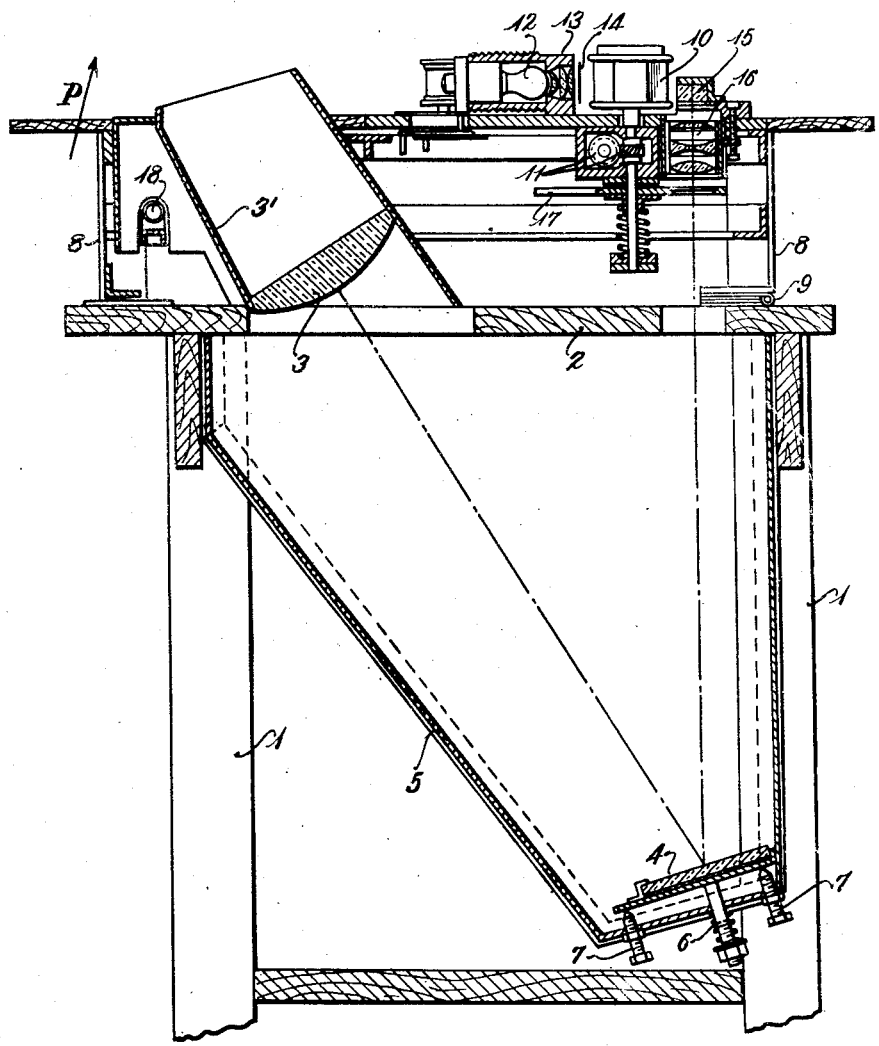

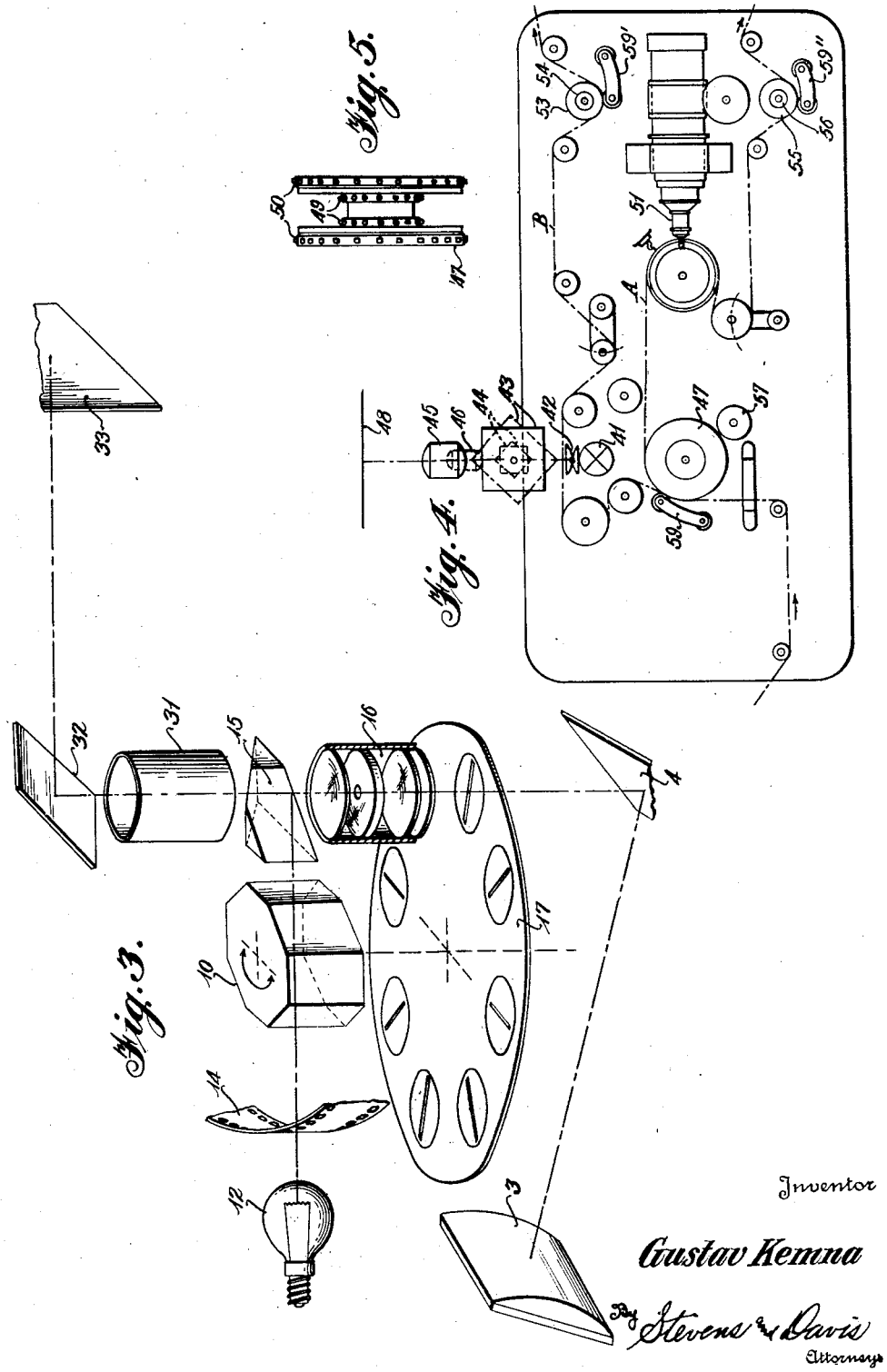

Inventor
Gustav Kemna
By Stevens and Davis
Attorneys

Patented Sept. 29, 1942

2,297,222

UNITED STATES PATENT OFFICE 2,297,222

FILM INSPECTING APPARATUS

Gustav Kemna, Babelsberg, Germany; vested in the Alien Property Custodian

Original application June 9, 1938, Serial No. 212,784. Divided and this application June 19, 1939, Serial No. 279,975

6 Claims. (Cl. 88—16.8)

The invention relates to film inspection machines or tables which are employed for examining a picture film and its accompanying sound film, in order to ascertain whether the picture and sound are in synchronism, whether at any part there is any technical or artistic objection to the picture or sound reproduction, and generally to edit the film, the final cutting of the sound film, and/or picture film being effected on the table.

An object of the invention is to construct and arrange the optical part of such apparatus in a novel manner whereby an improvement of the apparatus as a whole is achieved. Another object is to effect a substantial simplification of the apparatus whereby its operation is greatly facilitated and it is easier to manufacture and maintain. Another object is to provide an apparatus of the class referred to in which all electrical conductors and all mechanical and optical connections are more easily accessible than hitherto so that their supervision is facilitated. A further object is the provision of means for readily adapting the apparatus for inspecting a picture film with its accompanying sound film, regardless of whether the two films under examination are both of standard (35 mm.) or sub-standard size, or are of different sizes.

For a more detailed explanation of the invention, reference is made to the accompanying drawings illustrating two embodiments by way of example.

In the drawings:

Fig. 2 is a sectional view of the apparatus taken on the line 2—2 of Fig. 1 and drawn on a larger scale;

Fig. 3 illustrates schematically on a larger scale the optical part of the apparatus, the possible courses of the light rays being indicated in chain-dotted lines;

Fig. 4 illustrates another embodiment showing means for adaption to different film sizes;

Fig. 5 shows a detail of Fig. 4 on larger scale; and

Figure 6:
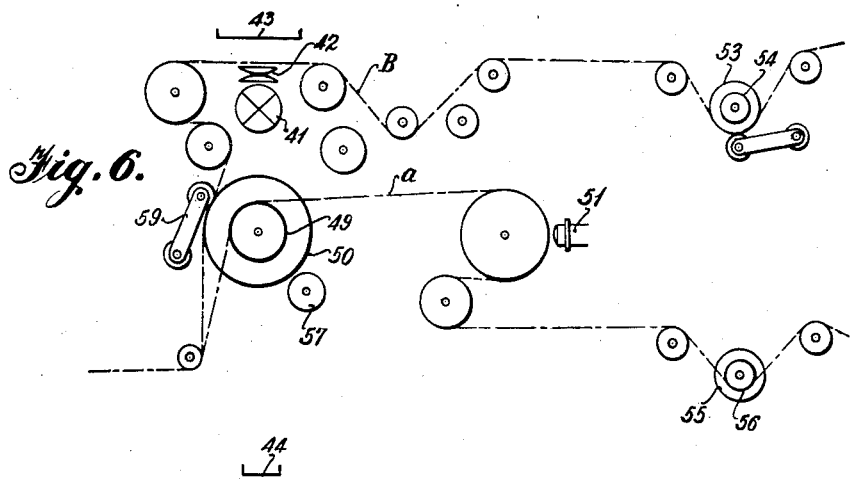
Figure 7:
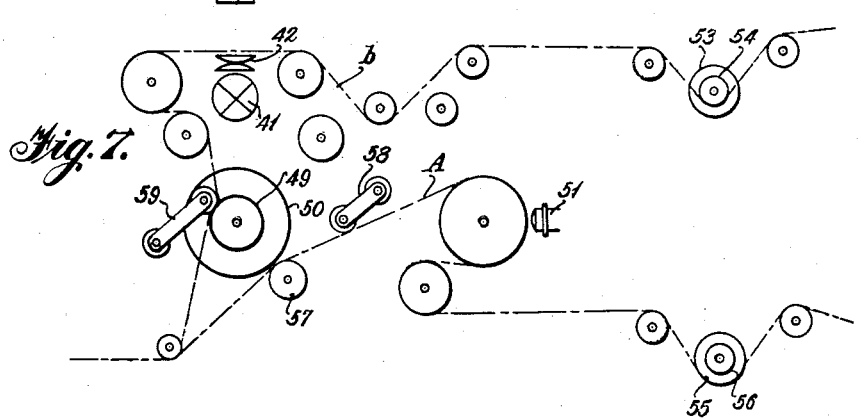
Figure 8:
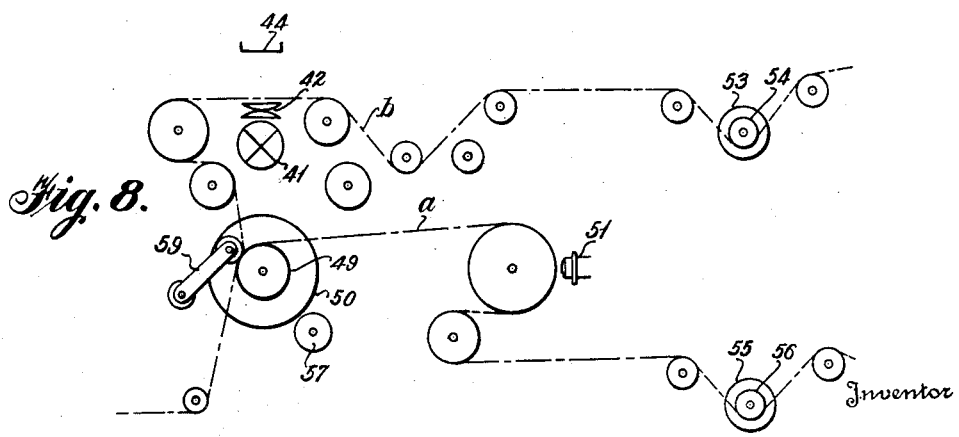

Figs. 6, 7 and 8 schematically illustrate the manner in which the apparatus of Fig. 4 is utilized for various combinations of film sizes.

Figure 1:
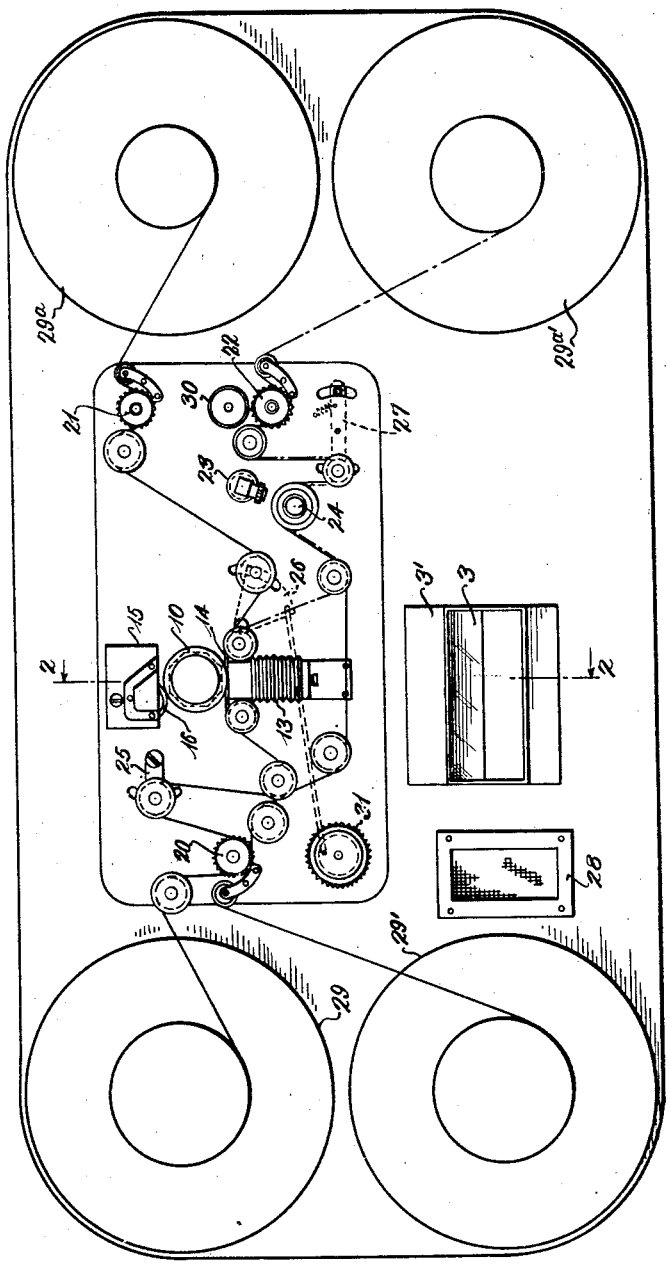
Fig. 1 is a plan view of one embodiment of the apparatus, details irrelevant to the invention being omitted.

The general layout of the apparatus top or "operating table" as it will be called herein for convenience can be seen from Fig. 1. The picture film runs from the top left feed spool 29 and the sound film from the bottom left feed spool 29', both films being synchronized by being led together over a synchronising sprocket 20. From there the picture film passes over the tensioning roller 25 and conventionally-provided idler rollers, past a film gate at 14, over a movable roller 26 mechanically coupled to a manual control knob 31 for adjusting the displacement of the film track, and thence over an eight-frame driven sprocket 21, finally being wound on the top right take-up spool 29a. The sound film passes from the synchronising sprocket 20 by way of conventional idler rollers over a drum within which is a photocell 24, the film passing between the photocell and a slit projector 23 for exciting the cell in known manner. The sound film then passes over a tensioning roller carried by the adjustable tensioning lever 27, and thence passes over an idler roller to a driven sprocket 22, which is advantageously an eight-frame sprocket. From there the sound film is wound on the bottom right take-up spool 29a'. A friction roller 30 is provided for moving the film by hand. 28 indicates a loudspeaker through which is reproduced in known manner the sound recorded on the film.

Referring to Figs. 1 and 2, the optical part of the apparatus comprises a matt screen 3 and hood 3' located to the front of the operating table, and behind these a lamp house 13 containing a lamp 12, an eight-sided prism 10, an objective 15 and lens system 16. The eight-sided prism 10 is mounted on a vertical shaft and rotated by a worm drive 11. On the same shaft is mounted a disc 17 which rotates with the prism 10 and is provided with slit diaphragms, arranged radially and so that they come vertically below the lens system 16, as shown more clearly in Fig. 3. Above the system 16, the deviating prism 15 is rigidly mounted on the operating table of the apparatus.

The operating table comprises depending sides 8 forming a casing open at the bottom which is supported by an under-structure comprising an upright frame 1 and platform 2, the operating table being hinged at its back to the platform 2 as at 9 so that it can be raised from the front in the direction of the arrow shown in Fig. 2.

The film feed devices and the optical and other devices so far described are mounted above and below the operating table and carried thereby as can be seen from Figs. 1 and 2. The operating table casing also carries the necessary electrical equipment including an amplifier (not shown) for amplifying the output of the photocell 24 and passing it to the loudspeaker 28, adjustable resistance or resistances 18 for controlling the intensity of the lamp 12 and also if desired the exciter lamp of the slit projector 23, all necessary conductors for electrically connecting the various electrical devices, and also the necessary control knobs or the like for regulating the lamps and the sound reproduction. Details of such equipment are not shown since it is of conventional character and per se forms no part of the present invention. However, preferably the control knobs or the like of the apparatus are arranged at the front of the operating table casing below the position indicated by P in Fig. 2 so that they are immediately in front of the operator and conveniently placed for handling. For protecting the control knobs or the like against inadvertent operation, the surface of the operating table is preferably extended at the front P so as to overhang the side 8 of the casing and advantageously also the platform 2 is similarly extended, whereby the control knobs or the like are contained in a channel or recess at the front of the operating table. Preferably, also, the electrical devices controlled by the said knobs or the like are arranged as near as possible to the front of the table so that the electrical connections can be as short as possible.

The under-structure 1, 2 carries a light tight box or chamber 5 which is fitted with an adjustable mirror 4 for projecting light onto the matt viewing screen 3, the platform 2 being apertured to permit the necessary transmission of light. Adjustment of the mirror 4 is effected by means of the adjusting screws 6 and 7.

In the preferred arrangement as illustrated, the optical system is built into the middle zone of the apparatus so that in the ideal case the centre ray of light from the lamp 12 lies in a vertical plane A—B Fig. 1, throughout its passage from the lamp 12 to the viewing screen 3. In practice it is not necessary to achieve exactly this ideal arrangement since with an approximation the same advantages are obtained of a simple and compact construction and conservation of light giving intensely illuminated and sharp pictures free from color fringes.

In the preferred arrangement, the electrical equipment, as well as the optical system, is built in the middle zone of the table so that all connections are kept as short as possible with consequent simplification in maintenance.

With the exception of the mirror 4, all optical, mechanical and electrical parts of the apparatus are carried by the operating table, whether mounted on its surface or built within its casing. Simply by lifting the operating table about the hinge 9, everything built into the interior of this casing is rendered easily accessible so that cleaning, inspection and general supervision of all the devices is facilitated. The surface of the operating table and also the platform 2 of the supporting structure may be extended at the back such that the operating table when opened can safely rest with its back edge on the platform 2, in spite of its weight.

Fig. 3 illustrates the operation of the described optical system. Light from the lamp 12 penetrates the picture film 14 and passes undeviated through the rotating octagonal prism 10 when the incident light is normal to a face of the prism. The emerging beam is deviated by the prism 15. According to the position of the latter the beam can be thrown upwards to a collecting lens 31, and thence reflected by a mirror 32 onto a picture screen 33. Generally, however, the prism 15 is so adjusted that the beam is deflected vertically downwards through the lens system 16 and diaphragm disc 17, and is reflected by the mirror 4 onto the matt viewing screen 3 which preferably is or is combined with a field lens as illustrated. In order to permit the transmission of light in this manner it will be understood, of course, that the successive registration of the slits in the disc 17 with the lens system 16 will be synchronised with the movement of the faces of the prism 10 successively into the position of normal light incidence. Since the rotating prism 10 only allows light to pass therethrough undeviated if it is incident normal to the prism surfaces and since all rays deviated by the prism 15 are screened in a sharp manner by the objective 16 in conjunction with the diaphragm disc 17, the light beam leaving below the disc 17 is of strong intensity and unbent and also undisturbed in any other respect. Consequently, a clear and well-illuminated picture having sharp edges is projected onto the viewing screen 3.

A bright viewing screen may be employed instead of a matt screen, as the latter is not essential, but preferred.

The utility of the apparatus can be enhanced by the provision of means adapting it for use with films of varying size. A modification constructed with this purpose in view is illustrated in Figs. 4 to 8. The layout of the film-feeding devices and the picture and sound pick-ups mounted on the top of the operating table is shown diagrammatically in the plan view of Fig. 4, other details being omitted. As shown, the arrangement of the lamp and the construction of the prism for projecting the picture are a little different from the embodiment shown in Figs. 1 to 3, but this is not material, a similar projecting arrangement to that previously described may be employed.

Referring now to Fig. 4, light from a projection lamp 41 is collected by a condenser 42 and projected through the picture film B. The beam then meets a rotating prism 43 (corresponding to the prism 10 of Fig. 1), passes through an objective 45 and is projected onto a screen 48. The picture film B and sound film A run together one on the other, coming from the left in the figure, over the usual rollers onto the drum 47 where they part. The picture film B runs at the rearward portion of the operating table, over the customary rollers, and the sound film A runs similarly at the front portion. 51 indicates the conventional sound pick-up. The picture film runs over a take-up sprocket 53, 54 and the sound film runs over a take-up sprocket 55, 56. The film feed and take-up spools are of conventional type and are therefore not illustrated.

In order to adapt the apparatus for varying sizes of film, the sprocket 47 is constructed as a compound or multiple sprocket. Fig. 5 illustrates the construction for two sizes of film, the sprocket 50 being for use with standard size film and the sprocket 49 for use with a sub-standard film, both sprockets being mounted on the same shaft. Preferably, the sprocket 47 is provided with a number of teeth which will permit a projection of 16 frames per second.

The prism 43 and objective 45 used with standard film are interchangeable respectively with a prism 44 and an objective 46 for sub-standard film. Also, the take-up sprockets 53, 54 and 55, 56, are constructed like the sprocket 47, except that they are of smaller diameter, the sprockets 53 and 55 taking standard film and the sprockets 54 and 56 taking the same sub-standard film as sprocket 49. The presser rollers 59' and 59" operate both on the standard film and sub-standard films.

With the construction described, the inspection apparatus can be utilized for the following film combinations:

(1) Standard picture film, standard sound film (Fig. 4).

(2) Standard picture film, sub-standard sound film (Fig. 6).

(3) Sub-standard picture film, standard sound film (Fig. 7).

(4) Sub-standard picture film, sub-standard sound film (Fig. 8).

The figures illustrate the manner in which the picture and sound films are passed over the multiple sprockets in each combination. For convenience, the standard and sub-standard picture films are indicated by references B and b respectively and the standard and sub-standard sound films are indicated by A and a respectively.

It is essential that the path of the picture film from the sprocket 47 to the condenser 42 must be as long as the path of the sound film from the sprocket 47 to the sound pick-up. The basic condition has to be maintained according to Figs. 6 to 8 also when standard and sub-standard films are used at the same time.

As shown in Fig. 4, the centers of the prisms 43 and 44 coincide. This is advantageously obtained by providing that the mount for these objectives has the same shaft. The rotating prisms 43 and 44 are interchangeable most simply by placing them on a rotatable shaft. If the objectives are changed, then so also must the prisms be changed. The difference between the focal length of the sub-standard film objective 46 and the standard film objective 45 can be eliminated by displacing the objective holder automatically, e. g. by an automatic lever adjustment of known type, when the objective 45 or 46 is inserted, or the arrangement may be made in such a way that the objectives 45 and 46 can only be inserted into the holder when it assumes the correct position with regard to the picture screen 48.

An inspection apparatus constructed in such a manner enables a direct transition from sub-standard film to standard film and vice versa to be made without any difficulty. A further advantage of the new apparatus is that in consequence of the simplicity of construction, speeds up to 80 frames per second can be attained. This speed was only hitherto possible with the help of a lens disc which necessitated a rather complicated optical arrangement, because otherwise the optical adjustment of the apparatus was damaged.

This application is a division of application, Serial No. 212,784, filed June 9, 1938.

I claim:

1. In a film inspection apparatus comprising means for projecting an image beam from a constantly moving film, a regular plano-sided compensating prism for receiving said image beam and producing a stationary image beam, means for directing the image beam emerging from said prism through a shutter to a viewing screen, a common axis for said prism and shutter, said shutter being adapted to intermittently pass only a limited amount of said image beam, and means for operating and synchronizing said prism and said shutter to permit only that portion of the image beam which falls at approximately normal incidence to the faces of said prism to pass said shutter.

2. In a film inspection apparatus comprising means for projecting an image beam from a constantly moving film, a regular plano-sided compensating prism for receiving said image beam and producing a stationary image beam, means for directing the image beam emerging from said prism through a shutter to a viewing screen, said shutter having a narrow radial slit, a common shaft for said prism and shutter and means for operating and synchronizing the prism and shutter to permit the shutter opening to pass a maximum amount of light when a face of the prism is normal to the projection axis, said shutter having a sufficiently limited opening to pass only the image beam falling at approximately normal incidence to the faces of the prism.

3. In a film inspection apparatus comprising means for projecting an image beam from a constantly moving film, a regular plano-sided compensating prism for receiving said image beam and producing a stationary image beam, means for focusing and protecting the image beam through a shutter to a viewing screen, a common axis for said prism and shutter, and means for operating and synchronizing the prism and shutter so that the shutter opening passes a maximum amount of light when a face of the prism is normal to the projection axis, said shutter having a sufficiently limited opening to pass only the image beam falling at approximately normal incidence to the faces of the prism, a second means for focusing and projecting the image beam to a second viewing screen, and an adjustable reflecting means for directing the image beam emerging from said prism to either of said projecting means.

4. In a film inspection apparatus comprising means for projecting an image beam from a constantly moving film, a regular plano-sided compensating prism for receiving said image beam and producing a stationary image beam, means for directing the image beam emerging from said prism through a rotary shutter to a viewing screen, said shutter having a narrow radial slit, a common axis for said prism and shutter, and means for operating and synchronizing the prism and shutter so that the shutter opening passes a maximum amount of light when a face of the prism is normal to the projection axis, said shutter having a sufficiently limited opening to pass only the image beam falling at approximately normal incidence to the faces of the prism.

5. In a film inspection apparatus comprising means for projecting an image beam from a constantly moving film, a regular plano-sided compensating prism for producing a stationary image from a constantly moving film, means for directing the image beam emerging from said prism through a rotary shutter to a viewing screen, said shutter having a plurality of narrow radial slits corresponding in number to the faces of said prism, and a common shaft for said prism and shutter, said shutter having sufficiently limited openings to pass only the image beam falling at approximately normal incidence to the faces of the prism.

6. In a film inspection apparatus comprising a source of light for producing a light beam, means for continuously passing an image bearing film through said light beam to produce an image beam, a regular plano-sided compensating prism for receiving said image beam and producing a stationary image beam, reflecting means for directing the image beam emerging from said prism through a shutter, a common axis for said prism and shutter, means for operating and synchronizing the prism and shutter so that the shutter opening passes a maximum amount of light when a face of the prism is normal to the projection axis, said shutter having a sufficiently limited opening to pass only the image beam falling at approximately normal incidence to the faces of the prism, a second reflecting means for directing the image beam passed by the shutter to a translucent viewing screen, said viewing screen being positioned adjacent said source of light, said viewing screen and two reflecting means being arranged and adapted to project said light through a substantially triangular path.

GUSTAV KEMNA.